UNITED STATES PATENT OFFICE.

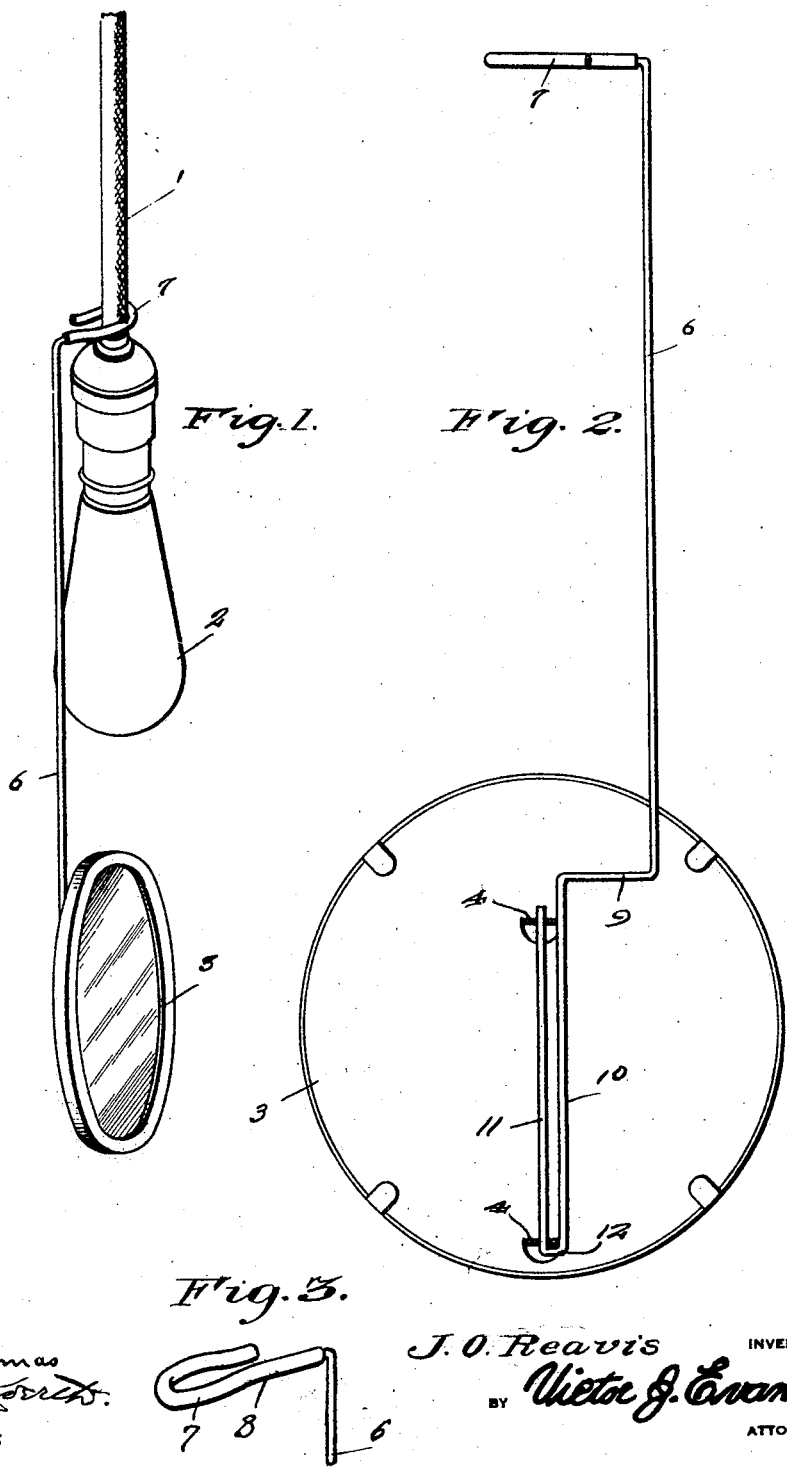

JESSE O. REAVIS, OF FORT WORTH, TEXAS.

MIRROR SUPPORT.

1,409,779.  Specification of Letters Patent. Patented Mar. 14, 1922.

Application filed July 16, 1921. Serial No. 485,146.

*To all whom it may concern:*

Be it known that I, JESSE O. REAVIS, a citizen of the United States, residing at Fort Worth, in the county of Tarrant and State of Texas, have invented new and useful Improvements in Mirror Supports, of which the following is a specification.

My present invention has reference to a mirror support.

My object is to produce a device which is primarily adapted for use by travelers, and which includes a mirror and a support therefor to which the mirror is hingedly but detachably connected, said support having means at one end thereof to engage with and sustain the same upon any suitable retaining means.

A further object is to produce a device of this character in which a mirror may be supported directly below an electric bulb, the support for the mirror having integrally formed therewith at the outer end thereof a spring clamp that has a compressible and insulating facing, whereby the same may be brought to engage with the supporting wire of an electric bulb, the mirror being pivotally sustained upon the support for a desired distance below the bulb, and incident to the pivotal connection of the mirror with the support, the same may be turned at varying desired angles on said support, and the device, as a whole, may be turned angularly with respect to the means on which it is sustained.

The foregoing, and other objects which will appear as the nature of the invention is better understood may be accomplished by a construction, combination and operative association of parts such as is disclosed by the drawings which accompany and which form part of this specification.

In the drawings:—

Figure 1 is a perspective view illustrating the improvement attached to the conductor for an electric bulb.

Figure 2 is a plan view looking toward the rear of the mirror, and showing the support arranged flat against the back of the mirror, parts being broken away and parts being in section.

Figure 3 is a fragmentary perspective view of the jaw or clamping portion of the support.

While, in Figure 1 of the drawings, I have illustrated the mirror supported from the conductor wire 1 of an electric bulb 2, such as is common in hotels or other rooms occupied by transient guests, it is to be understood that the improvement may be suspended from other suspending means. The device is primarily adapted for travelers use, and the parts constituting the same are separable so that they may be folded into a small, compact bundle which may be readily arranged in the traveler's case.

The mirror 3 is of the ordinary construction having a metal back. This back is, at desired intervals, formed with aligning U-shaped slots, and the metal bounded by the slots is bent outwardly to form ears 4. The ears are arranged in parallel relation to each other and each has an opening therethrough, the said openings being in alignment.

The support proper is preferably in the nature of a wire member which embodies an inherent resiliency. The wire support may be cheaply constructed, and cheapness of construction is one of the desirable objects of this invention. The support 6 has its upper end bent angularly upon itself, and the outer end of the said angle portion is rounded upon itself and bent inwardly, thus providing a jaw 7. The jaw 7 is covered by a compressible facing of insulating material, the same being preferably in the nature of a rubber tube 8. The jaw, at the upper end of the support can be readily arranged upon the bulb cord, as disclosed in Figure 1 of the drawings, and as a gripping engagement is maintained between the jaw and the said cord, the support will be sustained in a perfectly vertical position. The support 6, adjacent to the lower end thereof is extended at an angle in the direction of the jaw, said angle portion being indicated by the numeral 9. The angle portion 9 terminates approximately centrally with respect to the length of the jaw and is from thence extended downwardly, as at 10, the said portion 10 rounded upon itself and extended upwardly as at 11. The portion 11 provides an upwardly directed finger which is designed to be passed through the openings in the ears on the back of the mirror. One of the ears is disposed adjacent to one of the edges of the mirror and this ear rests upon the rounded portion 12 provided between the downturned portion 10 and the upturned finger 11. It will be noted, by reference to Figure 2 of the drawings, that the portion 10 is in frictional contact with the outer edges or peripheries of the ears 4, and such contact between the said element 10 and the ears will prevent the free or accidental swinging of the mirror 3 on the finger 11.

From the foregoing description, when taken in connection with the drawings it will be seen that I have produced a removable support for a mirror which may be readily attached to a lighting means so that the rays therefrom will illuminate the mirror. The mirror may be turned at any desired angle on the support, and the support may be likewise turned at desired angles on the suspending means therefor, and it is thought that the foregoing description, when taken in connection with the drawings will fully set forth the simplicity of the construction and the advantages thereof to those skilled in the art to which such inventions relate.

Having described the invention, I claim:—

In combination, a mirror having its back provided with outturned ears having openings therethrough which are in alignment, a support comprising a wire member having its upper end bent to provide a spring jaw, a facing of insulating material on the jaw, said member, adjacent its lower end being bent inwardly in the direction of the jaw and from thence continued downwardly, said downturned portion being rounded upon itself and extended to provide an upwardly directed finger designed to be received in the ears of the mirror, and the downturned portion of the wire being in frictional engagement with the outer edges of the ears, as and for the purpose set forth.

In testimony whereof I affix my signature.

JESSE O. REAVIS.